Jan. 12, 1971  P. L. FORD  3,553,770
LOIN SCRIBING GUIDE
Filed Feb. 7, 1968
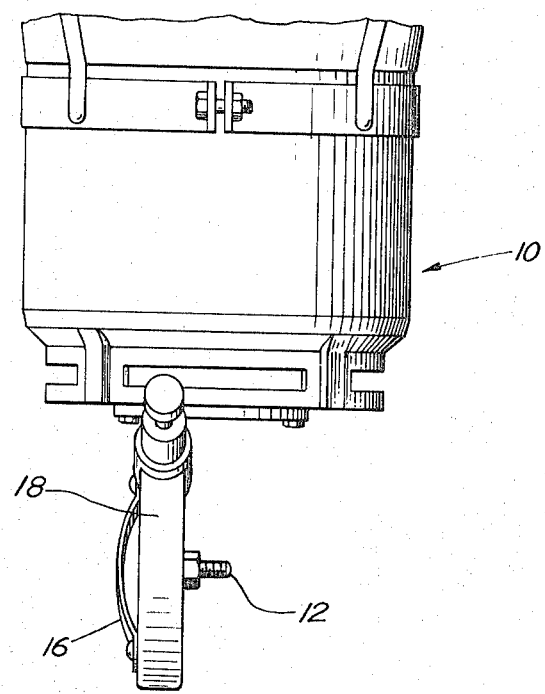
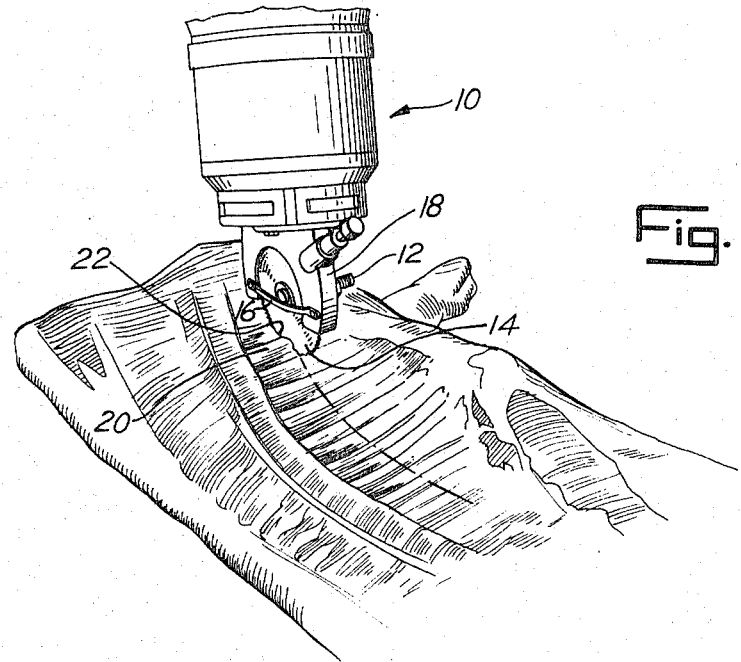
INVENTOR.
PAUL L. FORD
BY
Carl C. Batz
ATTORNEY

United States Patent Office 3,553,770
Patented Jan. 12, 1971

3,553,770
LOIN SCRIBING GUIDE
Paul L. Ford, Flossmoor, Ill., assignor to Armour and Company, Chicago, Ill., a corporation of Delaware
Filed Feb. 7, 1968, Ser. No. 703,671
Int. Cl. A22c *17/02*
U.S. Cl. 17—52                                       1 Claim

ABSTRACT OF THE DISCLOSURE

A method of separating the loin ribs from the spare ribs of a hog carcass with a scribe saw having specially adapted projections wherein one projection abuts against the spine to provide an accurate, stabilized scribe line.

---

This invention relates to a new method for severing the ribs in the side of an animal carcass, and more particularly, severing the ribs in hog sides.

Many cutting operations are performed to break up the carcass of livestock into a variety of commercially saleable cuts of meat. One such operation when dealing with livestock such as hogs, for example, is to transversely sever the ribs in the hog side in preparation for the loin "pulling" or removal operation.

After the hog has been slaughtered and its entrails removed and certain members severed from the carcass, the remaining carcass is split lengthwise into two halves referred to as "undressed sides." The break up of each side usually begins with the severance of the front and rear end portions containing the jowl, shoulder and front legs, and the ham containing the buttocks and rear leg. The remaining side is referred to as the "dressed" side and comprises the central portion of the undressed side. The dressed side, hereinafter referred to simply as the side, comprises four principal cuts of meat: the "fat back" which is a fatty layer on the back portion of the side; the "belly" which is the underside and the lower half of the side; the "loin" which is in the interior of the side underneath the ribs and between the fat back and belly; and the "spare ribs" which cover the abdominal cavity and forms a part of the belly.

In separating the aforesaid component parts of the side, the first step is usually to transversely sever the ribs for the length of the side with a rotary saw or the like. The spine and upper portion of the ribs generally define one of the boundaries of the loin and the upper portion of the ribs must be severed before the loin can be removed from under the ribs. This is referred to as "scribing the hog side," or "scribing the loin," or more simply as "scribing," and the transverse cut severing the ribs is referred to as the "scribe mark."

Once the side is scribed, an operator will insert one arm of a conventional U-shaped loin pulling knife in between the loin and the fat back and the other arm in the scribe mark and draw the knife toward himself in such a manner as to cut and pull the loin free of the side.

One difficulty with this procedure, however, is in maximizing the amount of loin pulled from the side. The loin is one of the most valuable cuts of meat in a hog side and much of the loin is left on the side because of improper scribing. In order to pull a maximum loin from a hog side, one of the most important steps is to make the beginning or start of the scribe cut about one and three-quarters (1¾) of an inch from the spine on the second rib from the front of the side (the end severed from the jowl and shoulder). If the beginning of the initial scribe cut is closer to the spine, the operator tends to make the rest of the scribe too close to the spine with the result that not all of the valuable loin will be removed from the side when the loin is pulled. If the beginning of the scribe is further away from the spine, the operator tends to make the rest of the scribe too far from the spine with the result that part of the belly will be removed with the loin which will require additional handling to have the belly trimmed from the loin. Furthermore, such trimmed portions are treated as scrap which has a value much less than that of the belly.

In large packinghouses, the sides are moved rapidly on conveyors and are scribed by an operator by means of an overhead scribe saw, such as the type manufactured by Best and Donavan. However, because of the rapid rate at which the sides move by, the operator has very little time to properly position the cutting blade of scribe saw as aforesaid with the result that the scribe is not made where it can maximize the loin and minimize further handling of the loin to trim belly thereform.

SUMMARY OF INVENTION

It is therefore an object of the present inevntion to provide a new method for scribing the sides of livestock, and more particularly hog sides, which will maximize the amount of loins pulled therefrom.

A further object of the invention is to provide a new method for scribing the sides of livestock, and more particularly hog sides, which will minimize the amount of other portions of the side removed with the loin.

Other objects and advantages of the invention will become apparent as the specification proceeds.

It has been discovered that maximum loin yields are achieved by the method of the instant invention which employs a conventional scribe saw especially adapted for use with the method. The adaptation comprises a projecting means extending a predetermined distance from each face of the cutting blade of the saw. In scribing the side, the scribe saw is first positioned so that one of the projecting means abuts against the spine in the carcass at a predetermined rib extending therefrom. The beginning of the scribe is made to a depth that will at least sever the ribs and the scribe is continued for the length of the side to follow and be parallel to the curvature of the spine.

DESCRIPTION OF THE DRAWINGS

The invention will be more specifically described in connection with the accompanying drawings in which:

FIG. 1 is an elevational view of a conventional scribe saw which has been modified to provide for projecting means extending a predetermined distance from each face of the cutting blade of the saw.

FIG. 2 is a perspective view of a hog side and the scribe saw of FIG. 1 in preparation for beginning a scribe cut.

DESCRIPTION OF A PREFERRED EMBODIMENT

In a preferred embodiment of the invention, which will be described as applied to a hog side, a conventional scribe saw 10 such as the Best and Donavan brand is modified to provide for projections of about one and three-quarters (1¾) of an inch from each face of the cutting blade.

The projection from one face of the blade is provided by changing the length of the bolt 12 which passes through the center of the blade 14 and connects the blade to the saw assembly so that the end of the bolt will project one and three-quarters (1¾) of an inch from the opposing face of the blade.

The projection from the opposite face of the blade is provided by a stainless steel curved bar 16 which is in line with the center of the scribe blade and horizontally fixed to the depth gauge 18 of the saw or at any other suitable place on the saw assembly. The curvature of the bar is such that the bar will project for a maximum distance of one and three-quarters (1¾) of an inch from the face of the blade.

With the scribe saw modified as aforesaid, the saw is positioned so that one of the projections (depending on whether the saw is used in a right hand or left hand position) will abut against the spine in the hog side at the second rib 20 from the front end. The operator then bears down on the saw and makes the beginning of the cut or scribe 22 which will also be one and three-quarters (1¾) of an inch from the spine and transversely to the second rib from the front end. This initial scribe is made to a depth that will at least sever the ribs and the scribe is continued for the length of the side to follow and be parallel to the curvature of the spine.

By the method of the instant invention the guess work and operator error in scribing hog sides are eliminated for every hog side is scribed about one and three-quarters (1¾) of an inch from the spine at the second rib which has been found to be the distance required to maximize loin yields and minimize the amount of fat back and belly removed with the loin.

This method has been described in connection with a Best and Donavan scribe saw but it must be understood that the invention is not limited thereto but can be used with any conventional scribe saw. Furthermore, the invention is not limited to the projecting means described as aforesaid but comprehends any projecting means suitable for the purpose of making the scribe a predetermined distance from the spine.

In practicing the invention on hog sides, the beginning of the scribe cut has been made one and three-quarters (1¾) of an inch from the spine on the second rib from the front. In practicing the invention on the sides of other livestock, however, the point where the beginning of the scribe cut is made may vary depending upon the particular animal.

By the same token, while the embodiment of the invention chosen herein for purposes of the disclosure is considered to be preferred, the invention is intended to cover all changes and modifications of the disclosed embodiment which fall within the spirit and scope of the invention.

What is claimed is:

1. In a method for scribing the side of a hog carcass with a scribe saw provided with projecting means extending a fixed distance from at least one face of the cutting blade of said scribe saw, wherein a cut is made into said side with said saw lengthwise of the carcass and transverse of the ribs to a depth that will sever the loin ribs from the spare ribs, the steps of placing said projecting means into abutting relationship with the interior side of the spine and drawing said saw lengthwise of the carcass while maintaining said projecting means in abutting relationship with the spine whereby a cut is made parallel to the spine and at a constant distance from the spine throughout the length of the cut.

References Cited
UNITED STATES PATENTS

| | | | |
|---|---|---|---|
| 431,097 | 7/1890 | Wilder | 17—1X |
| 1,546,982 | 7/1925 | Hilthon et al. | 143—43(1.5) |
| 2,510,173 | 6/1950 | Harter | 17—23 |
| 3,159,869 | 12/1964 | Vogt et al. | 17—1 |

LUCIE H. LAUDENSLAGER, Primary Examiner

U.S. Cl. X.R.

17—1